Patented Sept. 30, 1941

2,257,481

UNITED STATES PATENT OFFICE 2,257,481

PROCESS FOR PREPARING WETTING AND FROTHING AGENTS AND PRODUCT THEREOF

Fredric Pollak, Yonkers, N. Y.

No Drawing. Application September 30, 1939, Serial No. 297,415. In Great Britain October 1, 1938

12 Claims. (Cl. 260—566)

This invention relates to the preparation of wetting and frothing agents.

Condensation products of 2,4-diaminotoluene and formaldehyde are known; they serve as intermediate products for the production of dyestuffs of the diphenylmethane series. Such products are obtained when 1 molecule of formaldehyde is allowed to act on two molecules of the base.

Further a resinous product which is insoluble in water can be prepared from the two said starting substances if the condensation is carried out in the presence of such a little acid that the di-acid salt of the base cannot form.

It is further known to condense approximately equimolecular proportions of m-toluylene diamine and formaldehyde, and to dry the resulting dye-intermediate product.

The formaldehyde-diaminotoluene condensation products provided by the process of this invention are neither dye-stuffs or starting materials for such nor do they pass over into insoluble resins at elevated temperature. On the other hand they are characterized by the property of possessing in solutions astounding wetting and frothing capabilities, properties which reveal themselves even at dilutions of 1 in 100,000.

It is accordingly an object of the invention to produce by the condensation of diaminotoluene and formaldehyde a wetting and frothing agent of astounding efficiency.

It is a further object of the invention to produce a wetting and frothing agent of the named type which is soluble in water and particularly readily soluble in acidified water.

It is a further object of the invention to produce liquors of far-reaching wetting and frothing capability by adding even extremely small quantities of the instant products to alkaline or to acid solutions.

The process provided by the present invention for preparing wetting and frothing agents generally spoken consists in preparing a condensation product from 1 molecule of 2,4-diaminotoluene and at least 1 molecule of formaldehyde and heating the said product to temperatures of at least 70° C.

The heating treatment brings about a remarkable change of the condensation products, whereby the final substance obtained acquires outstanding wetting properties and a surprising solubility.

The process may be carried out in the presence of sufficient acid to form the diacid salt of the amine, evaporating the solution down and heating the dry residue.

It is however, also possible to proceed by first of all condensing the 2,4 diaminotoluene with formaldehyde in neutral or alkaline solution, and then heating the condensation product to at least 70° C. either in the absence of acid or after having been dissolved in acid.

The following examples show the manner of working according to the process of this invention.

Example 1

122 parts by weight of 2,4-diaminotoluene are dissolved in 2 litres of normal sulphuric acid and 225 parts by volume of 40% by volume formaldehyde are added. A slight heating of the solution sets in. After standing for a short while the mixture is evaporated to dryness on a water bath and then heated dry for some time e. g. 1 to 5 hours at 70–80° C.

The powder obtained in this way is light brown colored and dissolves readily in lukewarm water. From the concentrated aqueous solution a slightly brownish coloured base may be precipitated by means of alkalies which is soluble in alcohol, acetone and chloroform, but is insoluble in benzene and ether.

The sulphuric acid salt prepared as described above even at concentrations of 1/10,000% gives both with alkalies and with acids highly frothing solutions of great wetting capability.

Example 2

122 parts by weight of 2,4-diaminotoluene are dissolved in 2 litres of normal hydrochloric acid and treated with 75 parts by volume of 40% by volume formaldehyde. The mixture is evaporated down to dryness and heated in an oven for 2 to 3 hours at 130° C. A brown product remains which is readily soluble in water. This product shows in alkaline solution a satisfactory wetting and frothing power even at dilutions of 1 in 100,000.

Example 3

61 parts by weight of 2,4-diaminotoluene are dissolved in 1200 parts of warm water; the whole is cooled down to 33° C. and 37.5 parts by volume of 40% by volume formaldehyde are added which has previously been made weakly alkaline. A slightly brownish precipitate is formed which is filtered off and dried at low temperature. This substance, which melts at 68° C., is dissolved in glycol or acetone, yields a solution which on dilution with water in the proportion of 1:2,000 shows a slight wetting capability in the presence of acid.

If this product however is heated to temperatures of 70°–80° C. it fuses together to form a dark colored melt which now satisfactorily wets in alkali solution at dilutions of 1 in 80,000. The melting point of this product is 108°–110° C. If, further, the product is heated to above the melting point, that is to say for example to 130°–140° C. a still somewhat darker coloured product is formed the wetting capability limit in alkaline solution of which lies at 1 in 40,000. This product may also be directly dissolved in acid and used; the wetting capability limit in an acid solution is 1 in 50,000.

The product obtained by dissolution in acids of the condensation product formed in the cold according to Example 3, evaporation and heating of the evaporation residue to at least 70° C., e. g. to 100° C., even shows a far better frothing capability. The wetting capability limit both in acid solutions and alkaline solution is for this substance 1 in 100,000.

I claim:

1. A process for preparing wetting and frothing agents, comprising preparing a condensation product from 1 molecule of 2,4-diaminotoluene and at least 1 molecule of formaldehyde and heating said product to a temperature of at least 70° C. and below the decomposition temperature of said product for a period of between about 1 hour and about 5 hours.

2. A process for preparing wetting and frothing agents, comprising preparing a condensation product from 1 molecule of 2,4-diaminotoluene and at least 1 molecule of formaldehyde and heating said product to a temperature of between 70° and 140° C. for a period of between about 1 hour and about 5 hours.

3. A process for preparing wetting and frothing agents, comprising condensing in neutral solution 1 molecule of 2,4-diaminotoluene and at least 1 molecule of formaldehyde, separating the product of said condensation and heating the same to a temperature of between 70° C. and substantially below the decomposition temperature of said product for a period of between about 1 hour and about 5 hours.

4. A process for preparing wetting and frothing agents, comprising condensing in alkaline solution 1 molecule of 2,4-diaminotoluene and at least 1 molecule of formaldehyde separating the product of said condensation and heating the same to a temperature of at least 70° C. and below the decomposition temperature of said product for a period of about 1 hour and about 5 hours.

5. A process for preparing wetting and frothing agents, comprising preparing a condensation product from 1 molecule 2,4-diaminotoluene and at least 1 molecule of formaldehyde in the presence of sufficient mineral acid to form the di-acid salt of the amine, evaporating the solution to dryness and heating the dry residue to a temperature of at least 70° C. and below the decomposition temperature of the residue for a period of between about 1 hour and about 5 hours.

6. A process for preparing wetting and frothing agents, comprising condensing in neutral solution 1 molecule of 2,4-diaminotoluene and at least 1 molecule of formaldehyde, separating the product of said condensation, dissolving the same in a solvent selected from the group consisting of glycol and acetone, evaporating said solution to dryness and heating the dried residue to a temperature of above 70° C. and below the decomposition temperature of the residue for a period of between about 1 hour and about 5 hours.

7. A process for preparing wetting and frothing agents, comprising condensing in alkaline solution 1 molecule of 2,4-diaminotoluene and at least 1 molecule of formaldehyde, separating the product of said condensation, dissolving the same in a solvent selected from the group consisting of glycol and acetone, evaporating said solution to dryness and heating the dried residue to a temperature of between 70° C. and substantially below the decomposition temperature of the residue for a period of between about 1 hour and about 5 hours.

8. A process for preparing wetting and frothing agents, comprising condensing in neutral solution 1 molecule of 2,4-diaminotoluene and at least 1 molecule of formaldehyde, separating the product of said condensation, heating the same to a temperature of between 70° C. and substantially below the decomposition temperature of said product and dissolving the heated product in a mineral acid.

9. A process for preparing wetting and frothing agents, comprising condensing in alkaline solution 1 molecule of 2,4-diaminotoluene and at least 1 molecule of formaldehyde, separating the product of said condensation, heating said product to a temperature of at least 70° C. and below the decomposition temperature of said product and dissolving the heated product in a mineral acid.

10. A process for preparing wetting and frothing agents, comprising preparing a condensation product from 1 molecule 2,4-diaminotoluene and at least 1 molecule of formaldehyde, heating said product to a temperature of between 70° C. to about 80° C., melting the product and heating the same further above its melting point to a temperature between approximately 130°–140° C.

11. A process for preparing wetting and frothing agents, comprising preparing a condensation product from 1 molecule 2,4-diaminotoluene and at least 1 molecule of formaldehyde, dissolving said product in a mineral acid, evaporating said solution to dryness and heating the dried product to approximately 100° C.

12. As a new compound a 2,4-diaminotoluene-formaldehyde condensation product which has been heated in the dry state to a temperature of between at least 70° C. and approximately 140° C. and cooled to room temperature, being water soluble and having wetting and frothing properties.

FREDRIC POLLAK.